(12) United States Patent
Miller et al.

(10) Patent No.: US 12,553,403 B1
(45) Date of Patent: Feb. 17, 2026

(54) GAS TURBINE ENGINE HAVING A THRUST REVERSER SYSTEM WITH DRAG LINK CONNECTORS AT INTER-COMPRESSOR FRAME STRUCTURE

(71) Applicant: General Electric Company, Evendale, OH (US)

(72) Inventors: Brandon W. Miller, Middletown, OH (US); Stephen G. Matava, Andover, MA (US); Eric Barre, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/277,730

(22) Filed: Jul. 23, 2025

(51) Int. Cl.
| | |
|---|---|
| F02K 1/72 | (2006.01) |
| F02C 6/08 | (2006.01) |
| F02C 9/18 | (2006.01) |
| F02C 9/52 | (2006.01) |
| F02K 1/15 | (2006.01) |
| F02K 1/80 | (2006.01) |

(52) U.S. Cl.
CPC .................. *F02K 1/72* (2013.01); *F02C 6/08* (2013.01); *F02C 9/18* (2013.01); *F02C 9/52* (2013.01); *F02K 1/15* (2013.01); *F02K 1/80* (2013.01)

(58) Field of Classification Search
CPC ..... F02K 1/15; F02K 1/72; F02K 1/80; F02C 6/08; F02C 9/18; F02C 9/52
See application file for complete search history.

(56) References Cited

U.S. PATENT DOCUMENTS

| | | | |
|---|---|---|---|
| 3,638,428 A | 2/1972 | Shipley et al. | |
| 4,698,964 A | 10/1987 | Glancy | |
| 4,716,724 A | * 1/1988 | Newton | F02K 1/1261 239/265.29 |

(Continued)

FOREIGN PATENT DOCUMENTS

| | | |
|---|---|---|
| FR | 3127269 A1 | 3/2023 |
| FR | 3130896 A1 | 6/2023 |

(Continued)

*Primary Examiner* — Kyle Robert Thomas
(74) *Attorney, Agent, or Firm* — Venable LLP; Edward A. Kmett; Michele V. Frank

(57) ABSTRACT

A gas turbine engine includes a fan assembly, a turbo-engine encased within a turbo-engine cowl structure, a nacelle, and a thrust reverser system arranged, at least in part, in the nacelle. The turbo-engine includes a low-pressure compressor, a high-pressure compressor, an inter-compressor frame structure between the low-pressure compressor and the high-pressure compressor and including an outer frame portion having a cowl door engagement member on an upstream side of the outer frame portion, and a plurality of cowl doors defining the turbo-engine cowl structure. Each cowl door includes an inter-compressor frame engagement portion that engages with the cowl door engagement member of the inter-compressor frame structure, and a plurality of thrust reverser drag link connectors arranged on an outer side of the cowl door and arranged between the upstream side of the inter-compressor frame structure and a downstream side of the inter-compressor frame structure.

20 Claims, 7 Drawing Sheets

(56) References Cited

U.S. PATENT DOCUMENTS

| | | | |
|---|---|---|---|
| 5,123,240 | A | 6/1992 | Frost et al. |
| 5,845,482 | A | 12/1998 | Carscallen |
| 6,434,927 | B1 * | 8/2002 | Stretton ................ F02K 1/72 |
| | | | 239/265.31 |
| 7,594,403 | B2 | 9/2009 | Cadieux |
| 9,464,594 | B2 | 10/2016 | Pesyna |
| 9,518,513 | B2 | 12/2016 | Pritchard, Jr. et al. |
| 9,982,598 | B2 | 5/2018 | Pritchard, Jr. et al. |
| 10,287,892 | B2 | 5/2019 | Ahmad et al. |
| 10,883,447 | B2 * | 1/2021 | Ancuta ................ B64D 33/04 |
| 2013/0266423 | A1 * | 10/2013 | Vauchel ................ F02K 3/025 |
| | | | 415/148 |
| 2024/0110518 | A1 * | 4/2024 | Miller ................ F02C 9/18 |

FOREIGN PATENT DOCUMENTS

| | | | |
|---|---|---|---|
| FR | 3130897 | A1 | 6/2023 |
| FR | 3133367 | A1 | 9/2023 |
| FR | 3133368 | A1 | 9/2023 |

\* cited by examiner

GAS TURBINE ENGINE HAVING A THRUST REVERSER SYSTEM WITH DRAG LINK CONNECTORS AT INTER-COMPRESSOR FRAME STRUCTURE

TECHNICAL FIELD

The present disclosure relates to a gas turbine engine having a thrust reverser system.

BACKGROUND

Gas turbine engines may include a thrust reverser system. In a high-bypass gas turbine engine, a fan bypass airflow passage is arranged between a nacelle and a core engine cowl surrounding a core engine, and a cold stream thrust reverser system may be implemented therein. The cold stream thrust reverser system may generally include a translating nacelle cowl that is translated aft via a plurality of actuators, and a plurality of thrust reverser blocking doors are simultaneously actuated to redirect airflow flowing through the fan bypass airflow passage to flow through a thrust reversal flow passage in the nacelle created by the translating nacelle cowl.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
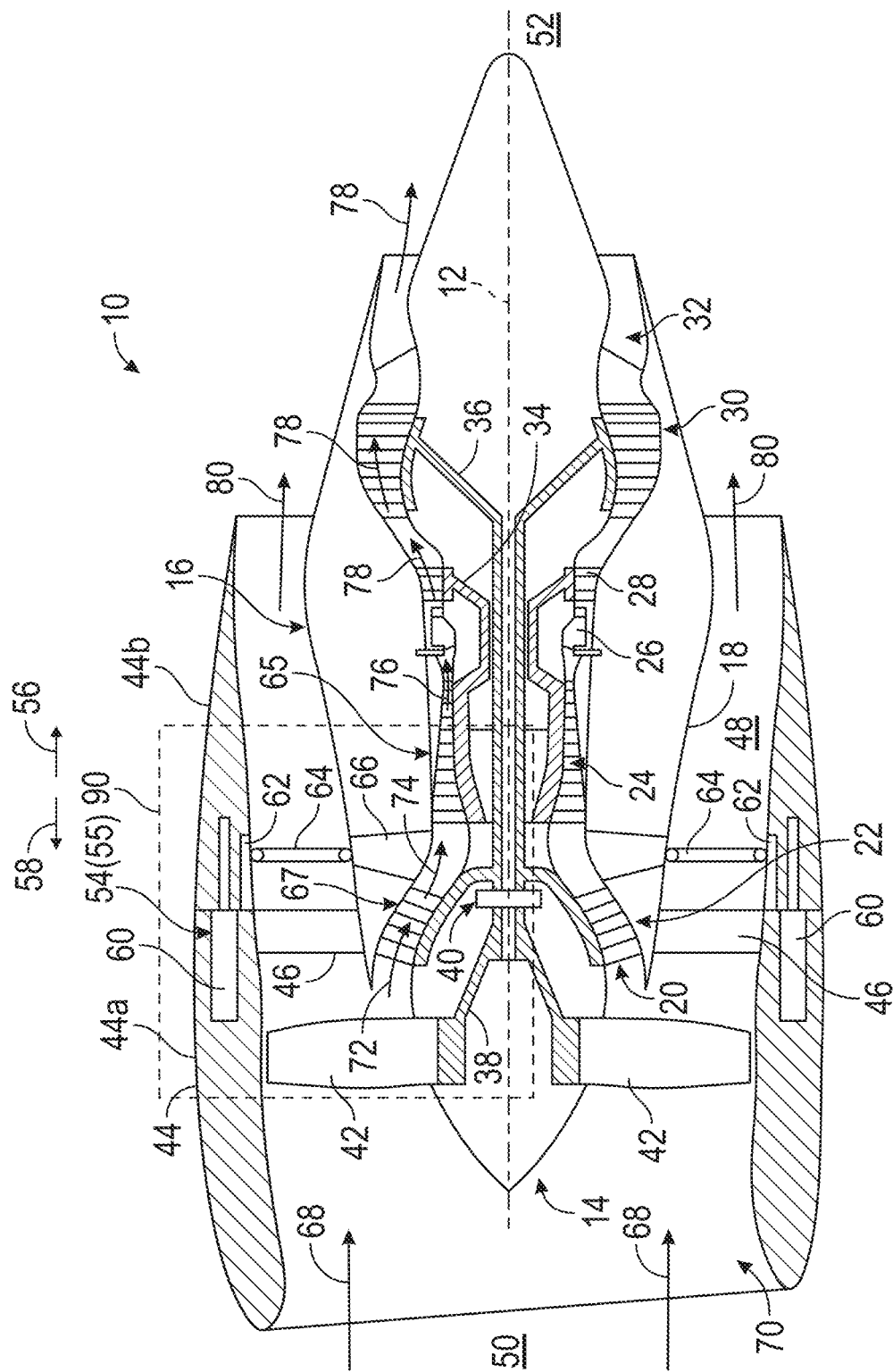
FIG. 1 is a schematic, partial cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle (e.g., an aircraft) with respect to a direction of travel. More particularly, forward and aft are used herein with reference to a direction of travel of the vehicle and a direction of propulsive thrust of the gas turbine engine.

As used herein, the terms "axial" and "axially" or "longitudinally" refer to directions and orientations that extend substantially parallel to a longitudinal centerline axis of the turbine engine. Moreover, the terms "radial" and "radially" refer to directions and orientations that extend substantially perpendicular to the longitudinal centerline axis of the turbine engine. In addition, as used herein, the terms "circumferential" and "circumferentially" refer to directions and orientations that extend arcuately about the longitudinal centerline axis of the turbine engine. Further, as used herein, the term "radial-tangential" refers to a direction and orientation that extends to include both a radial component with respect to the longitudinal centerline axis of the turbine engine (e.g., either radially toward or radially away from the longitudinal centerline axis), and a tangential component that is a tangent with respect to the circumferential direction about the longitudinal centerline axis of the turbine engine.

The terms "coupled," "connected," and the like, refer to both direct coupling, fixing, attaching, or connecting, as well as indirect coupling, fixing, attaching, or connecting through one or more intermediate components or features, unless otherwise specified herein.

The term "arranged in fluid communication with" or "in fluid communication with" or the like refers to elements that are fluidly connected together or arranged adjacent to one another to allow a flow of a fluid, including air, fuel, exhaust gases, etc., to flow from one element and to be received by the other element.

The term "arranged between" refers to an element being physically present or located between a first element and a second element.

The term "arranged in" refers to an element being located physically within another element.

The term "arranged to" or "configured to" refers to a structure that is specifically designed or constructed to perform a particular function following the term "to".

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

A gas turbine engine may include a thrust reverser system. In a high-bypass gas turbine engine, a fan bypass airflow passage is arranged between a nacelle and a turbo-engine cowl surrounding a turbo-engine, and a cold stream thrust reverser system may be implemented therein. The cold stream thrust reverser system may generally include a translating nacelle cowl that is translated aft via a plurality of actuators, and a plurality of thrust reverser blocking doors are simultaneously actuated to redirect airflow flowing through the fan bypass airflow passage through a thrust reversal flow passage in the nacelle created by the translating nacelle cowl. A forward side of each of the thrust reverser blocking doors may be connected to the translating nacelle cowl, and an aft side of each of the thrust reverser blocking doors may also be connected with a drag link that is connected to the turbo-engine cowl. As the nacelle cowl is translated aft by the actuators, the drag link causes each thrust reverser blocking door to rotate from being aligned in a generally axial direction toward being aligned in a generally radial direction, thereby redirecting the airflow within the fan bypass airflow passage.

The high-bypass turbine engine of the present disclosure may also include an inter-compressor frame structure arranged between a low-pressure compressor and a high-pressure compressor, where the inter-compressor frame structure supports a forward end of the turbo-engine cowl. A variable bleed valve may also be provided between the low-pressure compressor and the high-pressure compressor to bleed off compressed air flowing from the low-pressure compressor to the high-pressure compressor. The inter-compressor frame structure may form a bleed air plenum that receives bleed air from the variable bleed valve. An outer end of inter-compressor frame structure may include bleed air openings through with the bleed air from the bleed air plenum flows, with the bleed air from the bleed air opening being provided into the bypass airflow passage.

Referring now to the drawings, FIG. 1 is a schematic, partial cross-sectional side view of an exemplary high by-pass turbofan jet engine, herein referred to as "engine 10," as may incorporate various embodiments of the present disclosure. As shown in FIG. 1, engine 10 has a longitudinal centerline axis 12 that extends therethrough from an upstream end 50 of the engine 10 to a downstream end 52 of the engine 10 for reference purposes. In general, engine 10 may include a fan assembly 14 and a turbo-engine 16 disposed downstream from the fan assembly 14 and that drives the fan assembly 14.

The turbo-engine 16 may generally include a turbo-engine cowl structure 18 that defines an annular inlet 20 to the turbo-engine 16. The turbo-engine cowl structure 18, which will be described in more detail below, encases the turbo-engine 16. The turbo-engine 16 includes, in a serial flow relationship, a booster or a low-pressure (LP) compressor 22, a high-pressure (HP) compressor 24, a combustor 26, an HP turbine 28, an LP turbine 30, and a jet exhaust nozzle 32. An HP rotor shaft 34 drivingly connects the HP turbine 28 to the HP compressor 24. An LP rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gearbox assembly 40, such as in an indirect-drive or a geared-drive configuration.

As shown in FIG. 1, the fan assembly 14 includes a plurality of fan blades 42 that are coupled to, and extend radially outwardly from the fan shaft 38. An annular fan casing or a nacelle 44 circumferentially surrounds the fan assembly 14, or at least a portion of the turbo-engine 16, or both. The nacelle 44 may be supported relative to the turbo-engine 16 by a plurality of circumferentially spaced outlet guide vanes or struts 46. Moreover, at least a portion of the nacelle 44 may extend over an outer portion of the turbo-engine 16 so as to define a bypass airflow passage 48 between the nacelle 44 and the turbo-engine cowl structure 18. The nacelle 44 may include a forward nacelle portion 44a and an aft nacelle portion 44b. A thrust reverser system 54 may be implemented within the nacelle 44. The thrust reverser system 54 may be a cold stream cascade thrust reverser system 55 that includes a plurality of actuators 60 (two shown in FIG. 1), a plurality of thrust reverser blocking doors 62, and a plurality of drag links 64 connected with respective ones of the plurality of thrust reverser blocking doors 62, and connected with the turbo-engine cowl structure 18. As will be described in more detail below, the actuators 60 translate the aft nacelle portion 44b in an aft direction 56 to open a thrust reversal flow passage between the forward nacelle portion 44a and the aft nacelle portion 44b. The translation of the aft nacelle portion 44b also causes each of the plurality of thrust reverser blocking doors 62 to rotate from a generally longitudinal position as shown in FIG. 1 to a blocking position (described below) to redirect airflow flowing through the bypass airflow passage 48 to flow through the thrust reversal flow passage. The actuators 60 also cause the aft nacelle portion 44b to translate in a forward direction 58 to close the thrust reversal flow passage and to reposition the thrust reverser blocking doors 62 in the generally longitudinal direction as shown in FIG. 1.

As will be further described below, the engine 10 also includes an inter-compressor frame structure 66 arranged between the LP compressor 22 and the HP compressor 24. The inter-compressor frame structure 66 extends from an outer side 67 of a compressor casing 65 that encases the LP compressor 22 and the HP compressor 24. The inter-compressor frame structure 66 will be described in more detail below, but, in one respect, the inter-compressor frame structure 66 provides support for the turbo-engine cowl structure 18.

In operation of the engine 10, a volume of inlet air 68 enters the nacelle 44 at a nacelle inlet 70, and the inlet air 68 is propelled through the fan assembly 14. A portion of the inlet air 68 propelled by the fan assembly 14 enters the LP compressor 22 as a compressor inlet airflow 72, where the compressor inlet airflow 72 is compressed by the LP compressor 22 to generate compressed air 74. The compressed air 74 then flows to the HP compressor 24, where the compressed air 74 is further compressed to generate compressed air 76. The compressed air 76 from the HP compressor 24 enters the combustor 26. In the combustor 26, fuel is injected via fuel nozzles (not shown) to mix with the compressed air 76 to generate a fuel-air mixture (not shown) that is ignited and burned in the combustor 26 to generate combustion gases 78. The combustion gases 78 flow from the combustor 26 to the HP turbine 28, where work is extracted from the combustion gases 78 to rotate the HP turbine 28. The rotation of the HP turbine 28 thereby supports rotation of the HP compressor 24 via the HP rotor shaft 34. The combustion gases 78 then continue to flow downstream of the HP turbine 28 to the LP turbine 30, where additional work is extracted from the combustion gases 78 to rotate the LP turbine 30. The rotation of the LP turbine 30 thereby supports rotation of the LP compressor 22 via the LP rotor shaft 36, and also supports rotation of the fan assembly 14 via the fan shaft 38 connected to the reduction gearbox assembly 40. The remaining combustion gases 78 pass through the jet exhaust nozzle 32 and provide thrust.

Another portion of the inlet air 68 propelled by the fan assembly 14 flows through the bypass airflow passage 48, thereby providing a bypass airflow 80. The bypass airflow 80 provides a majority of the thrust for the engine 10. As will be described below, the bypass airflow 80 is redirected by the thrust reverser system 54 to provide a reverse thrust.

Figure 2A:
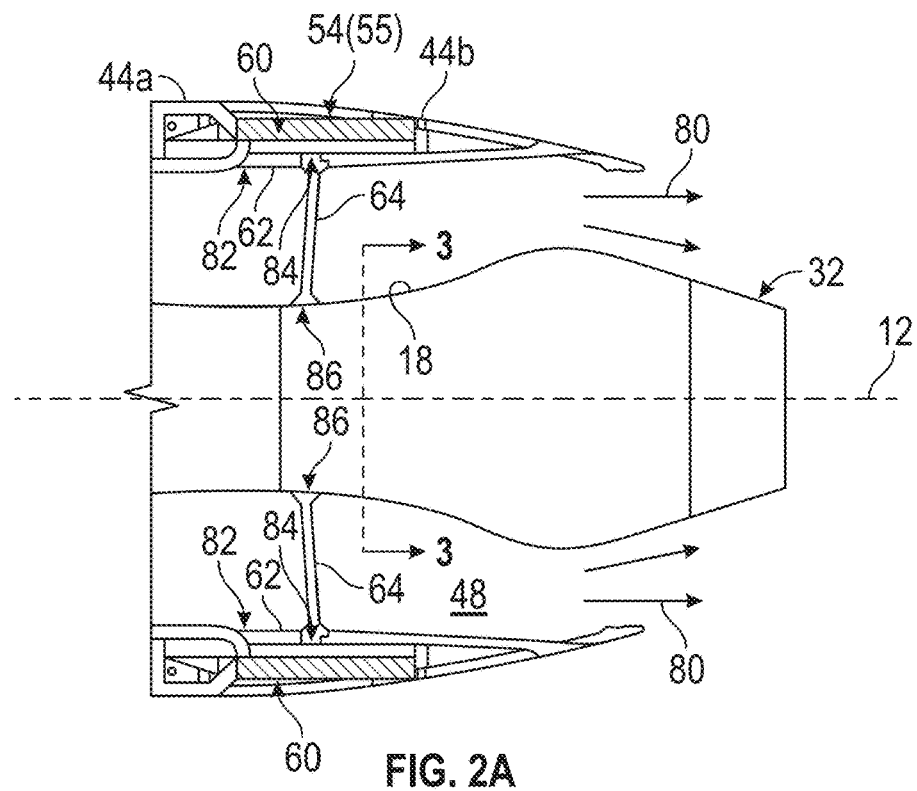
FIG. 2A is a cross-sectional view of an exemplary thrust reverser system in a stowed position, according to an aspect of the present disclosure.

FIG. 2A is a cross-sectional view of the thrust reverser system 54 shown in FIG. 1 in a stowed position, according to an aspect of the present disclosure. In FIG. 2A, details of the turbo-engine 16 are omitted and only the turbo-engine cowl structure 18 is included. As shown in FIG. 2A, the thrust reverser system 54 includes the plurality of actuators 60, and the plurality of thrust reverser blocking doors 62. Each thrust reverser blocking door 62 is rotatably connected to the aft nacelle portion 44b via a hinged-connection 82 and is connected to a respective one of the drag links 64 via a hinged connection 84. Each respective one of the plurality of drag links 64 is rotatably connected to the turbo-engine cowl structure 18 via a hinged connection 86. The hinged connection 86 of the drag link 64 and the turbo-engine cowl structure 18 will be described in more detail below. When the thrust reverser system 54 is in the stowed position as shown in FIG. 2A, the bypass airflow 80 flows through the bypass airflow passage 48 to provide forward thrust.

Figure 2B:
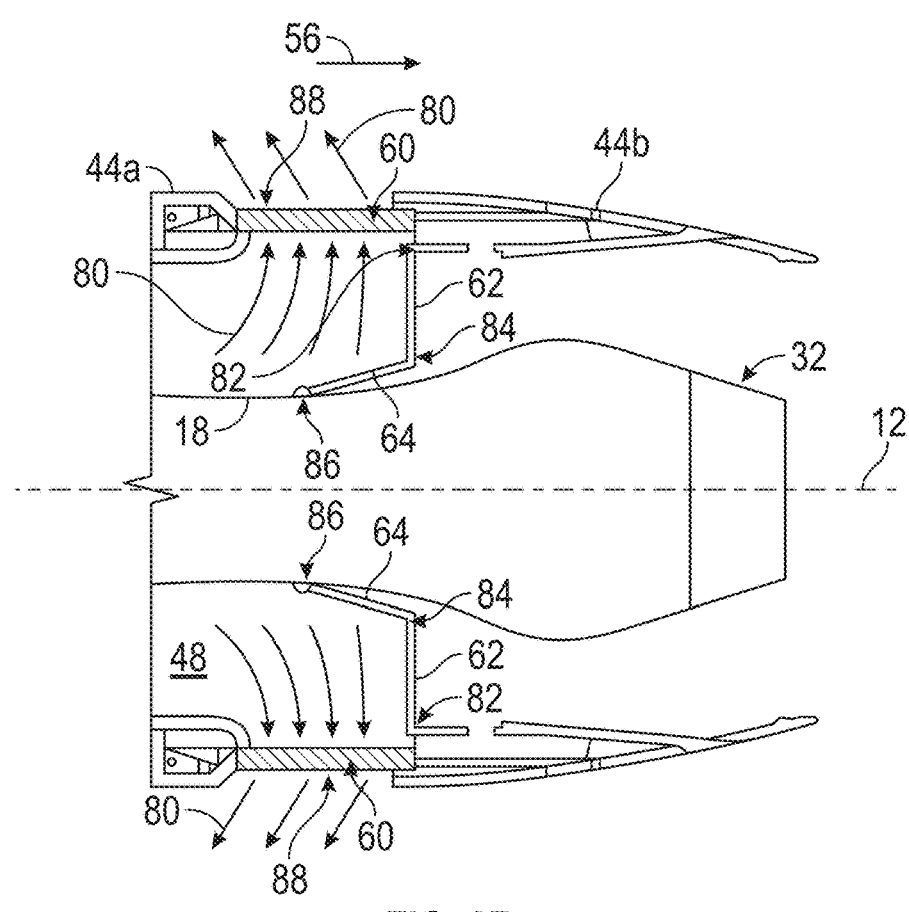
FIG. 2B is a cross-sectional view of the exemplary thrust reverser system of FIG. 2A, but, in a thrust reverse (or thrust reverser deployed) position, according to an aspect of the present disclosure.

FIG. 2B is a cross-sectional view of the thrust reverser system 54 of FIG. 2A, but in a thrust reverse (or thrust reverser deployed) position, according to an aspect of the present disclosure. In operation of the thrust reverser system 54, the plurality of actuators 60 are actuated and drive the aft nacelle portion 44b in the aft direction 56, thereby opening a thrust reversal flow passage 88 between the forward nacelle portion 44a and the aft nacelle portion 44b. As the actuators 60 drive the aft nacelle portion 44b in the aft direction 56, the hinged connection 84 between each drag link 64 and a respective thrust reverser blocking door 62 causes the thrust reverser blocking doors 62 to rotate from a closed position as shown in FIG. 2A to a deployed (blocking) position as shown in FIG. 2B. As a result, each of the thrust reverser blocking doors 62 redirect the bypass airflow 80 to flow through the thrust reversal flow passage 88, thereby providing reverse thrust.

Figure 3:
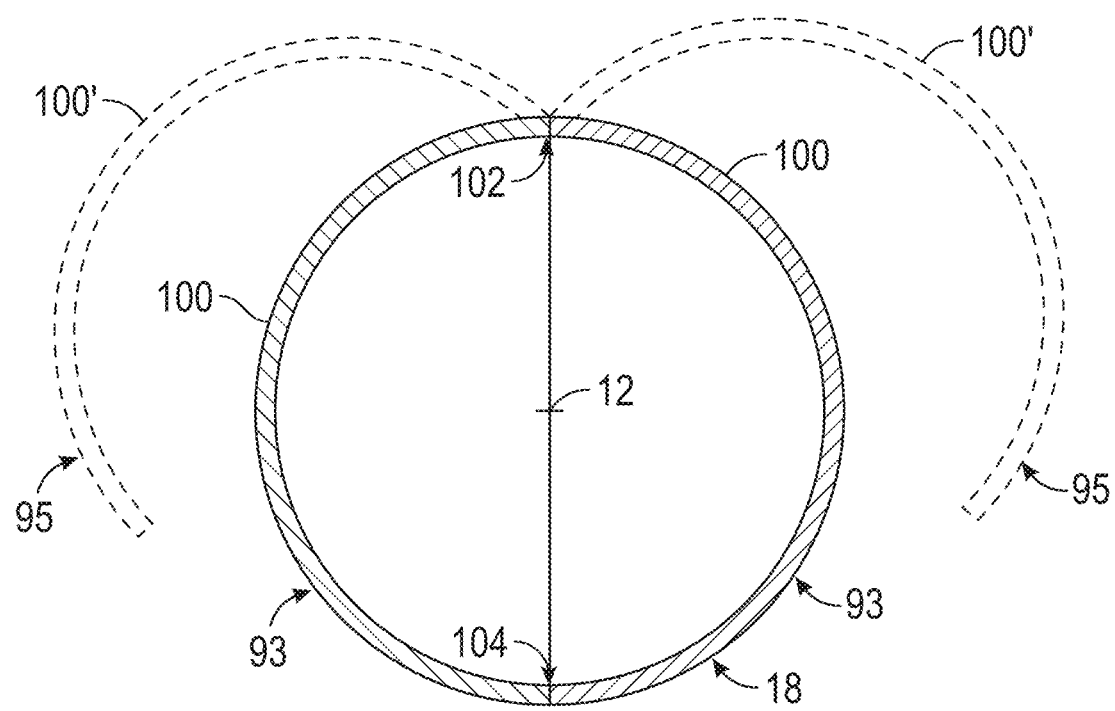
FIG. 3 is a cross-sectional view of a turbo-engine cowl structure of FIG. 2A, taken at plane 3-3 of FIG. 2A, according to an aspect of the present disclosure.

FIG. 3 is a cross-sectional view of the turbo-engine cowl structure 18, taken at plane 3-3 of FIG. 2A, according to an aspect of the present disclosure. As shown in FIG. 3, the turbo-engine cowl structure 18 includes a plurality of cowl doors 100. The cowl doors 100 may be connected to a cowl door hinge 102 that extends longitudinally (e.g., a direction into and out of the view of FIG. 3) with respect to the longitudinal centerline axis 12. The cowl doors 100 may be latched in a closed position 93 (shown in solid lines in FIG. 3) via a latching mechanism 104. The latching mechanism 104 may be unlatched so that the cowl doors 100 may be opened to an open position 95 (shown as cowl doors 100' in dashed lines in FIG. 3) in order to gain maintenance access to the turbo-engine 16 (FIG. 1). Thus, when two cowl doors 100 are implemented, each cowl door 100 may be extend semi-circumferentially (e.g., one hundred eighty degrees) about the longitudinal centerline axis 12. As will be explained in more detail below, a forward end of each cowl door 100 engages with the inter-compressor frame structure 66 (FIG. 1) when the cowl door 100 is in the closed position 93.

Figure 4:
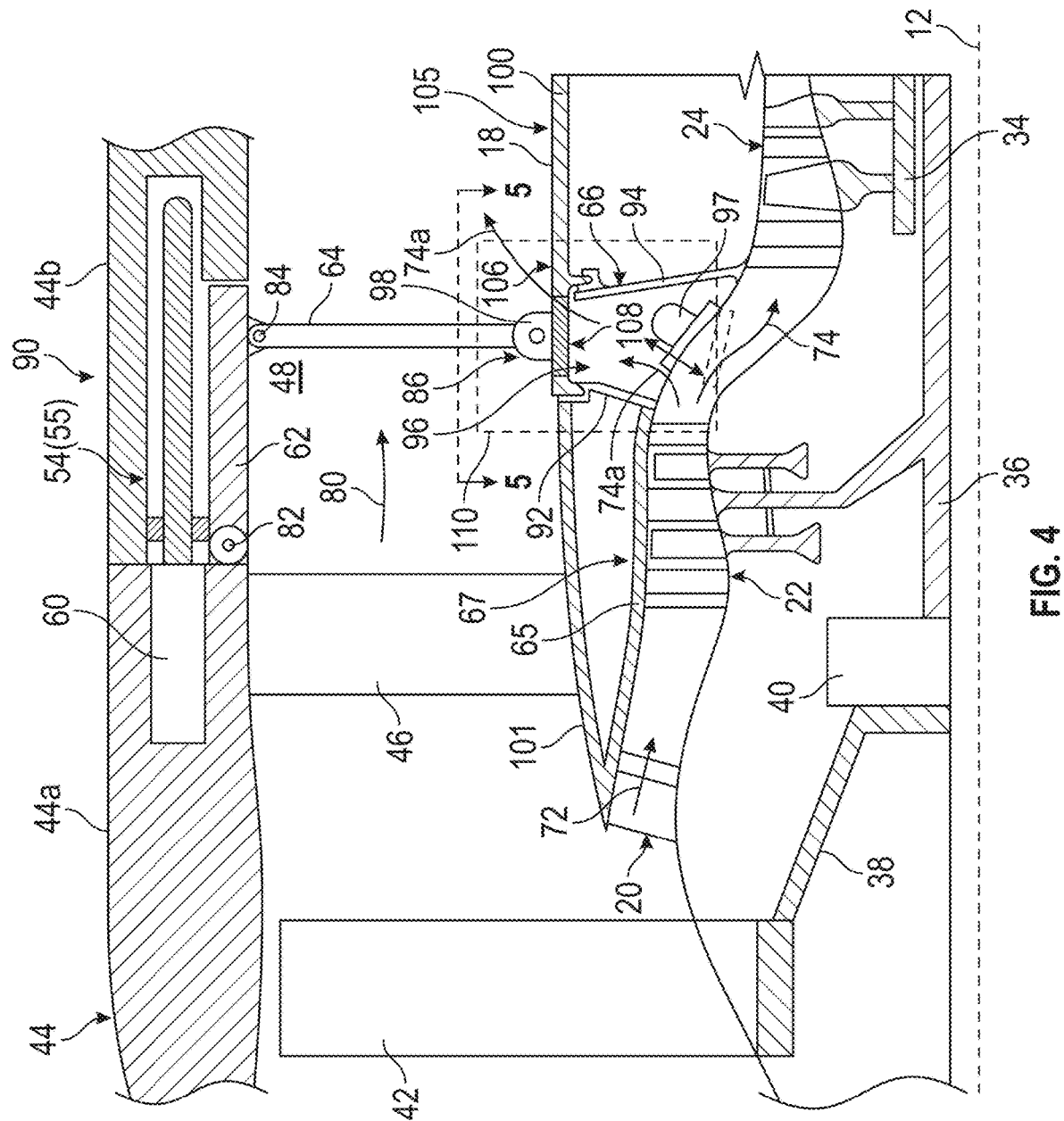
FIG. 4 is an enlarged, cross-sectional view of a portion of the engine of FIG. 1, taken at detail view 90, according to an aspect of the present disclosure.

FIG. 4 is an enlarged, cross-sectional view of a portion of the engine 10 of FIG. 1, taken at detail view 90, according to an aspect of the present disclosure. As shown in FIG. 4, the inter-compressor frame structure 66 includes an upstream wall 92 and a downstream wall 94, with a bleed air plenum 96 being defined between the upstream wall 92 and the downstream wall 94. A plurality of variable bleed air valves 97 (one shown in FIG. 3) are arranged circumferentially spaced apart about the longitudinal centerline axis 12 and are controlled to provide a flow of compressor bleed air 74a from the LP compressor 22 into the bleed air plenum 96. As will be explained below, the flow of the compressor bleed air 74a can then flow out of the bleed air plenum 96 through vents (to be described below) in the turbo-engine cowl structure 18 into the bypass airflow passage 48.

Referring still to FIG. 4, the cowl door 100 includes a plurality of thrust reverser drag link connectors 98 (one shown in FIG. 4) arranged on an outer side 105 of an upstream end 106 of the cowl doors 100. Respective ones of the plurality of thrust reverser drag link connectors 98 form a part of the plurality of hinged connections 86 that connect each drag link 64 to the turbo-engine cowl structure 18. The cowl doors 100 each includes a plurality of bleed air vents 108 extending therethrough to cause the compressor bleed air 74a to flow from the bleed air plenum 96 into the bypass airflow passage 48.

Figure 5:
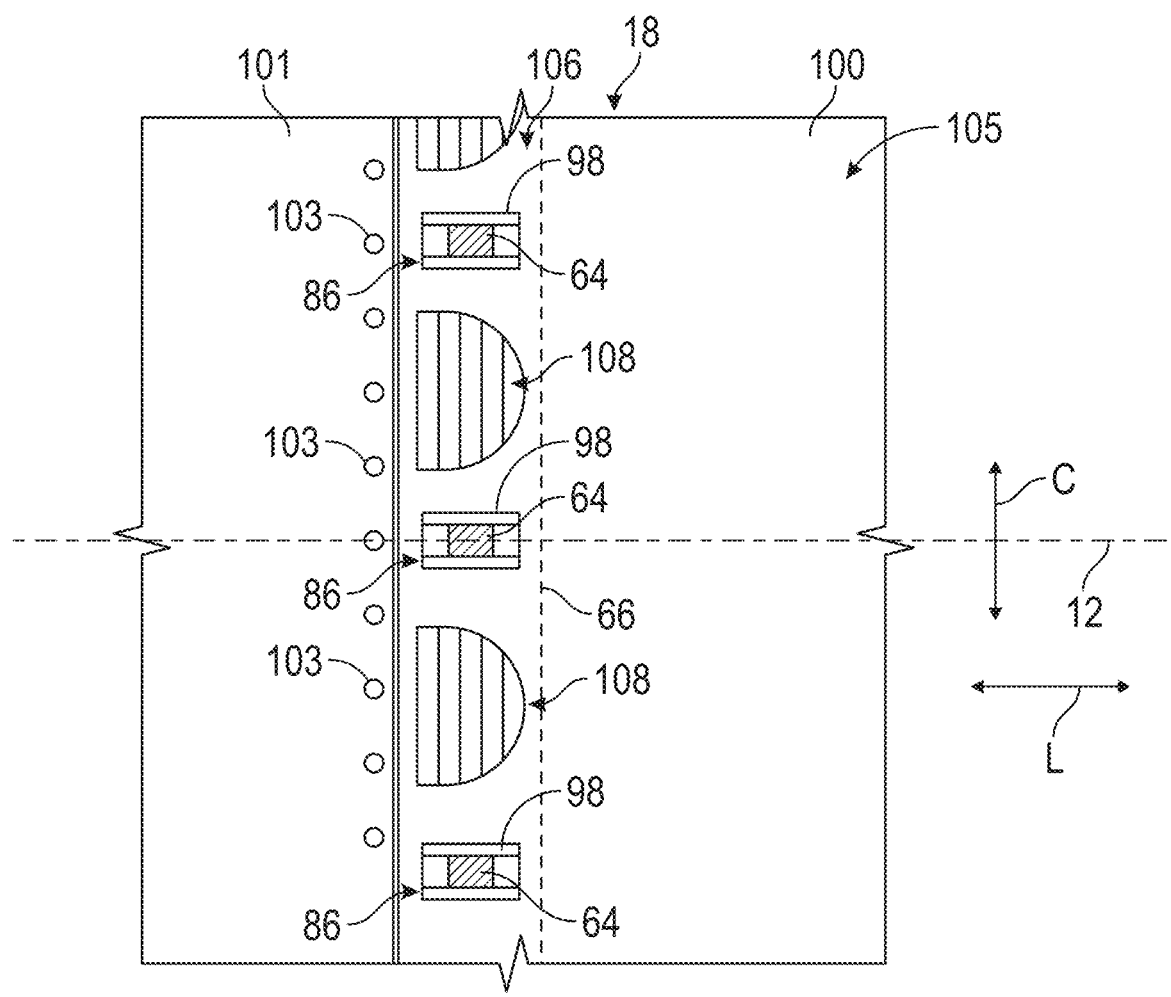
FIG. 5 is a partial, inward-looking view of the turbo-engine cowl structure, taken at view 5-5 of FIG. 4, according to an aspect of the present disclosure.

FIG. 5 is a partial, inward-looking view of the turbo-engine cowl structure 18, taken at view 5-5 of FIG. 4, according to an aspect of the present disclosure. In FIG. 5, the view of the circumferential curvature of the turbo-engine cowl structure 18 has been flattened. As shown in FIG. 5, the plurality of thrust reverser drag link connectors 98 are circumferentially spaced apart from each another in the circumferential direction C. In addition, the plurality of bleed air vents 108 extending through the cowl doors 100 are also circumferentially spaced apart from each other in the circumferential direction C. In the aspect shown in FIG. 5, the arrangement of the plurality of thrust reverser drag link connectors 98 and the plurality of bleed air vents 108 is an alternating arrangement of one thrust reverser drag link connector 98, one bleed air vent 108, one thrust reverser drag link connector 98, one bleed air vent 108, etc. Other arrangements of the thrust reverser drag link connectors 98 and the bleed air vents 108 may be implemented. For example, two or more bleed air vents 108 may be arranged between a pair of the thrust reverser drag link connectors 98.

Figure 6:
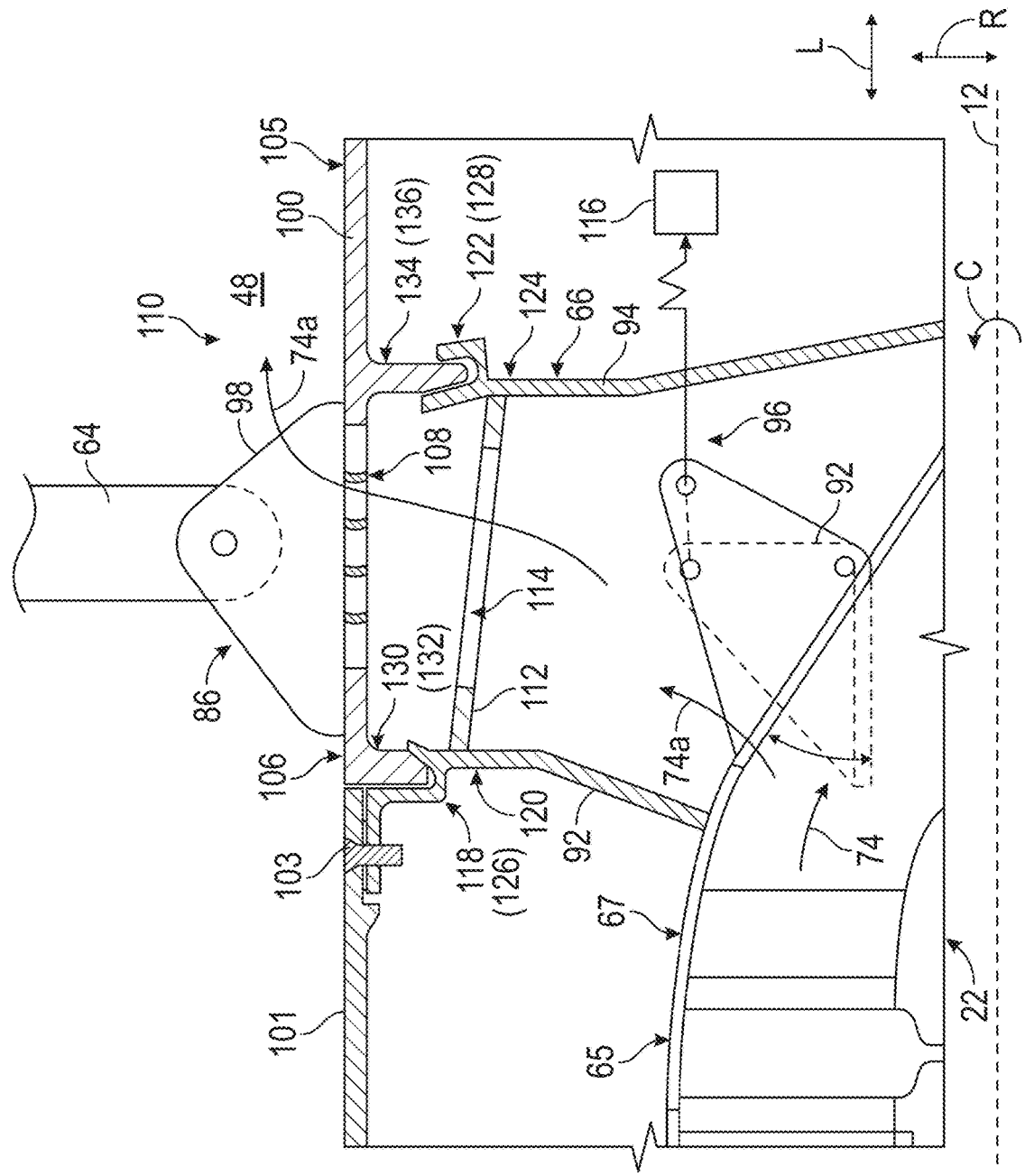
FIG. 6 is an enlarged, cross-sectional view of a portion of the engine of FIG. 4, taken at detail view 110, according to an aspect of the present disclosure.

FIG. 6 is an enlarged, cross-sectional view of a portion of the engine of FIG. 4, taken at detail view 110, according to an aspect of the present disclosure. In FIG. 6, elements that are the same as those in FIG. 4 include the same reference numerals and the description of those elements provided above is equally appliable to FIG. 6. As shown in FIG. 6, the inter-compressor frame structure 66 includes an outer frame portion 112 that includes a plurality of bleed air openings 114 (one shown in FIG. 6) therethrough. As was described above, the inter-compressor frame structure 66 includes the upstream wall 92, the downstream wall 94, and the bleed air plenum 96 defined between the upstream wall 92 and the downstream wall 94. The inter-compressor frame structure 66 extends circumferentially (three hundred sixty degrees) about the longitudinal centerline axis 12 (FIG. 1). Each of the plurality of variable bleed air valves 97 may be connected to an actuator 116 that controls closing and opening of the variable bleed air valve 97. In FIG. 6, one variable bleed air valve 97 is shown in the closed position with solid lines, and is shown in the open position with dashed lines. In the closed position, the compressor bleed air 74a is blocked from flowing into the bleed air plenum 96. In the open position, the compressor bleed air 74a is permitted to flow into the bleed air plenum 96, then flows through the bleed air openings 114 of the outer frame portion 112, and then through the plurality of bleed air vents 108 into the bypass airflow passage 48. In gas turbine engines, a low-pressure compressor variable bleed air valve (also referred to as an operability bleed valve) regulates airflow from the LP compressor discharge to the HP compressor and is implemented for maintaining stability and preventing surges during transient operations such as engine starts, accelerations, and decelerations. By venting excess pressure, the variable bleed air valve helps the engine maintain a stable operating point on the compressor map. For example, during rapid deceleration, the variable bleed air valve prevents an LP compressor stall by venting excess pressure. The variable bleed air valve is designed to open and to close based on the pressure difference across the compressor stages and the operating conditions of the engine. During startup and acceleration, the variable bleed air valve may be opened to vent excess pressure and to maintain stability. As the engine reaches stable operating conditions, the variable bleed air valve may be closed or partially open to regulate airflow as needed.

The outer frame portion 112 also includes a cowl door engagement member 118 on an upstream side 120 of the outer frame portion 112, and also includes a second cowl door engagement member 122 arranged on a downstream side 124 of the outer frame portion 112. The cowl door engagement member 118 may be a forward V-groove 126 that extends circumferentially (three hundred sixty degrees) about the longitudinal centerline axis 12 (FIG. 1). The second cowl door engagement member 122 may be an aft V-groove 128 that extends circumferentially (three hundred sixty degrees) about the longitudinal centerline axis 12. While the cowl door engagement member 118 and the second cowl door engagement member 122 are described as being a V-groove, other shapes of grooves may be implemented, including U-shaped grooves, square-shaped grooves, etc. A forward cowl portion 101 may be connected to the inter-compressor frame structure 66 via a plurality of fasteners 103 (one shown in FIG. 6).

In FIG. 6, the upstream end 106 of the cowl door 100 includes an inter-compressor frame engagement portion 130, which may be a forward flange 132 extending in a radially inward direction (R) with respect to the longitudinal centerline axis 12. The inter-compressor frame engagement portion 130 engages with the cowl door engagement member 118 to form a seal when the cowl door 100 is in the closed position. In FIG. 6, the upstream end 106 of the cowl door 100 may also include a second inter-compressor frame engagement portion 134 that may be an aft flange 136 extending in the radially inward direction (R) with respect to the longitudinal centerline axis 12. The second inter-compressor frame engagement portion 134 engages with the second cowl door engagement member 122 to form a seal when the cowl door 100 is in the closed position.

Thus, the arrangement of the inter-compressor frame structure 66 and the upstream end 106 of the cowl doors 100 provides for a seal of the bleed air plenum 96, while the bleed air vents 108 allow the compressor bleed air 74a to flow out of the bleed air plenum 96 into the bypass airflow passage 48. In addition, the inclusion of the inter-compressor frame engagement portion 130 to engage with the forward V-groove 126, and the second inter-compressor frame engagement portion 134 to engage with the aft V-groove 128, provides for better structural support for the plurality of drag link connectors 98. The better structural support reduces deflection of the cowl door 100, which may otherwise occur without the structural support. The deflection of the cowl door 100 would need to be accounted for in the overall thrust reverser system design, particularly for systems in which the drag link connectors 98 that are connected to the cowl door 100 are arranged downstream of the inter-compressor frame structure 66. In addition, the arrangement as shown in FIG. 6, for example, allows for moving the drag link connectors 98 forward of the aft side of the inter-compressor frame structure 66, which allows for shortening the overall length of the nacelle 44. The shortening of the length of the nacelle 44 can reduce the weight of the nacelle 44.

Figure 7:
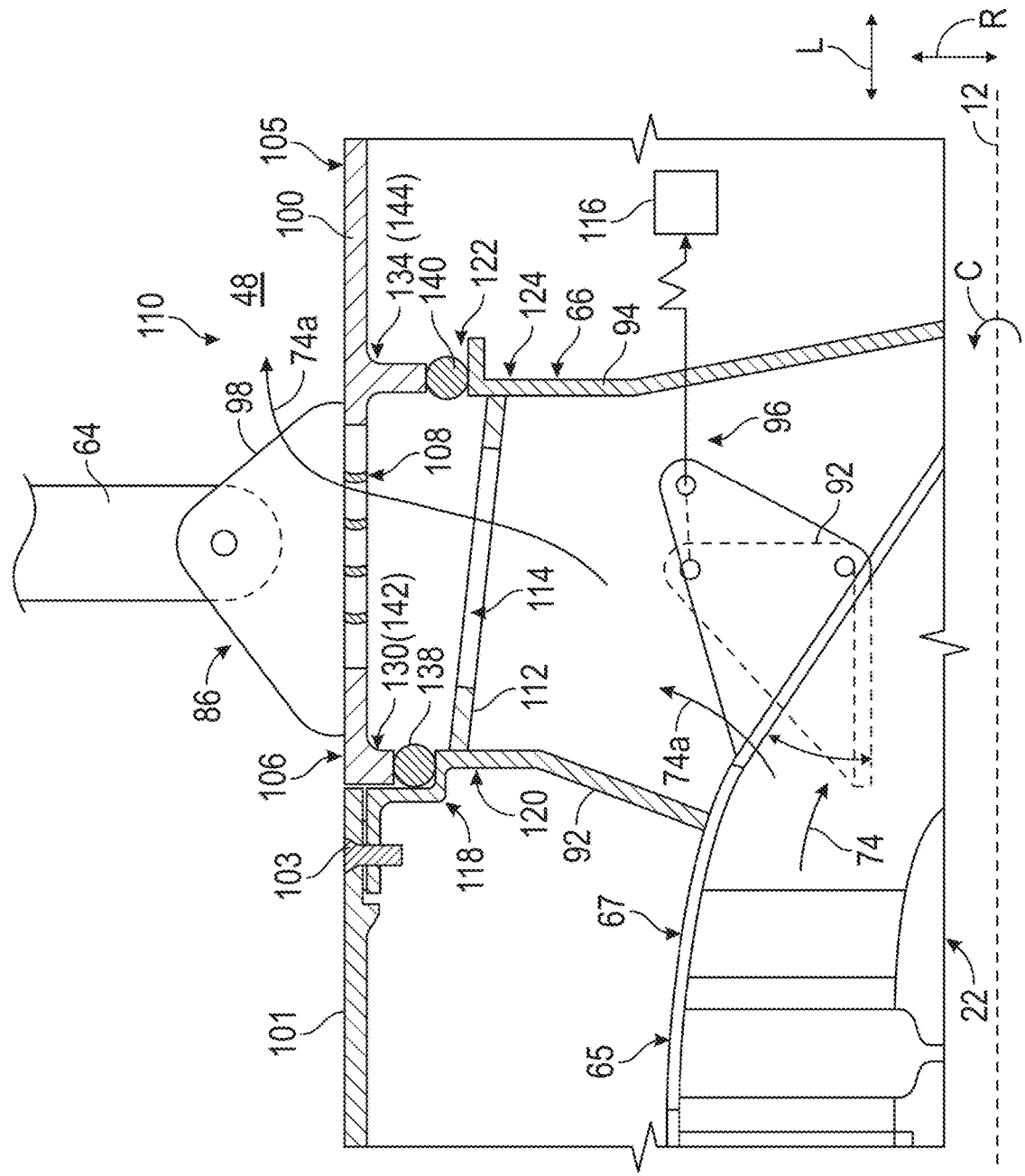
FIG. 7 is a cross-sectional view depicting an alternate arrangement of an inter-compressor frame structure to that of FIG. 6, according to an aspect of the present disclosure.

FIG. 7 is a cross-sectional view depicting an alternate arrangement of an inter-compressor frame structure to that of FIG. 6, according to an aspect of the present disclosure. In FIG. 7, elements that are the same as those of FIG. 6 include the same reference numerals and the description of those same elements provided above is equally applicable to FIG. 7. In FIG. 7, the cowl door engagement member 118 does not include the forward V-groove 126 and the second cowl door engagement member 122 does not include the aft V-groove 128. Rather, a forward fire seal 138 may be provided at the cowl door engagement member 118, and an aft fire seal 140 may be provided at the second cowl door engagement member 122. In addition, the inter-compressor frame engagement portion 130 of the cowl doors 100 may include a forward flange 142 that, in the closed position of the cowl door 100, engages with the forward fire seal 138, and the second inter-compressor frame engagement portion 134 may include an aft flange 144 that, in the closed position of the cowl door 100, engages with the aft fire seal 140. The forward fire seal 138 and the aft fire seal 140 may be, for example, a tubular-shaped seal that is manufactured from a fire-retardant material, although other shapes for the fire seal 138 and the aft fire seal 140 may be utilized.

While FIG. 6 depicts an arrangement that includes both the forward V-groove 126 and the aft V-groove 128, and while FIG. 7 depicts an arrangement that includes both the forward fire seal 138 and the aft fire seal 140, an arrangement that includes a combination of V-grooves and fire seals could be included. For example, an alternate arrangement may be implemented that includes the forward V-groove of FIG. 6 and the aft fire seal 140 of FIG. 7. Another alternate arrangement may include the forward fire seal 138 of FIG. 7 and the aft V-groove 128 of FIG. 6. In still another alternate arrangement, the forward V-groove 126 may be implemented with the forward fire seal 138 arranged within the forward V-groove 126, or the aft V-groove 128 may be implemented with the aft fire seal 140 arranged within the aft V-groove 128. In yet another alternate arrangement, the forward V-groove 126 may be implemented with the forward fire seal 138 arranged within the forward V-groove 126, and the aft V-groove 128 may be implemented with the aft fire seal 140 arranged within the aft V-groove 128.

Further aspects of the present disclosure are provided by the subject matter of the following clauses.

A gas turbine engine including a fan assembly, a turbo-engine arranged to drive the fan assembly and being at least partially encased within a turbo-engine cowl structure, a nacelle surrounding the fan assembly and at least a portion of the turbo-engine, a fan bypass airflow passage being arranged between the nacelle and the turbo-engine cowl structure, and a thrust reverser system arranged, at least in part, in the nacelle and including a plurality of actuators, a plurality of thrust reverser blocking doors, and a plurality of drag links connected with respective ones of the plurality of thrust reverser blocking doors and with the turbo-engine cowl structure via a plurality of thrust reverser drag link connectors, wherein the turbo-engine includes (a) a low-pressure compressor, (b) a high-pressure compressor arranged downstream of the low-pressure compressor, (c) an inter-compressor frame structure arranged between the low-pressure compressor and the high-pressure compressor, the inter-compressor frame structure including an outer frame portion having a cowl door engagement member arranged on a upstream side of the outer frame portion, and (d) a plurality of cowl doors defining at least a portion of the turbo-engine cowl structure, each cowl door among the plurality of cowl doors includes (i) an inter-compressor frame engagement portion arranged to engage with the cowl door engagement member of the inter-compressor frame structure, and (ii) the plurality of thrust reverser drag link connectors arranged on an outer side of the cowl door and arranged between the upstream side of the inter-compressor frame structure and a downstream side of the inter-compressor frame structure.

The gas turbine engine according to the preceding clause, wherein the plurality of drag links are connected with the turbo-engine cowl structure via respective ones of the plurality of thrust reverser drag link connectors.

The gas turbine engine according to any preceding clause, wherein the thrust reverser system is a cold stream cascade thrust reverser system.

The gas turbine engine according to any preceding clause, wherein the cowl door engagement member is at least one of a V-groove or a fire seal.

The gas turbine engine according to any preceding clause, wherein the inter-compressor frame engagement portion is a flange that engages with the V-groove or with the fire seal.

The gas turbine engine according to any preceding clause, wherein the plurality of cowl doors comprises two cowl doors, each cowl door being hinged via a cowl door hinge so as to translate the cowl doors between a closed position and an open position.

The gas turbine engine according to any preceding clause, wherein, in the closed position, for each cowl door of the plurality of cowl doors, the inter-compressor frame engagement portion of each cowl door engages in a circumferential direction with the cowl door engagement member of the inter-compressor frame structure.

The gas turbine engine according to any preceding clause, wherein the inter-compressor frame structure further includes an upstream wall and a downstream wall, and a plurality of bleed air openings are provided through the outer frame portion, a bleed air plenum being defined between the upstream wall and the downstream wall.

The gas turbine engine according to any preceding clause, further including a variable compressor bleed valve providing a flow of compressor bleed air from the low-pressure compressor into the bleed air plenum.

The gas turbine engine according to any preceding clause, wherein the plurality of cowl doors each includes a plurality of bleed air vents extending therethrough for providing a flow of the compressor bleed air flowing from the bleed air plenum and through the plurality of bleed air openings of the outer frame portion to flow therethrough into the fan bypass airflow passage.

The gas turbine engine according to any preceding clause, wherein the variable compressor bleed valve is an operability bleed valve that controls a flow of compressed air flowing from the low-pressure compressor to the high-pressure compressor by controlling the flow of the compressor bleed air flowing into the bleed air plenum.

The gas turbine engine according to any preceding clause, wherein the inter-compressor frame structure further includes a second cowl door engagement member arranged on the downstream side of the outer frame portion.

The gas turbine engine according to any preceding clause, wherein each cowl door further includes a second inter-compressor frame engagement portion arranged to engage with the second cowl door engagement member.

The gas turbine engine according to any preceding clause, wherein the second cowl door engagement member is at least one of a V-groove or a fire seal.

The gas turbine engine according to any preceding clause, wherein the second inter-compressor frame engagement portion is a flange that engages with the V-groove or with the fire seal of the second cowl door engagement member.

The gas turbine engine according to any preceding clause, wherein the gas turbine engine defines a longitudinal centerline axis extending from an upstream end of the gas turbine engine to a downstream end of the gas turbine engine, the inter-compressor frame structure extends circumferentially about the longitudinal centerline axis, and the plurality of cowl doors extend circumferentially about the longitudinal centerline axis.

The gas turbine engine according to any preceding clause, wherein respective ones of the plurality of thrust reverser drag link connectors are arranged circumferentially spaced apart from each other about the outer side of the plurality of cowl doors, and are arranged longitudinally on the outer side of the plurality of cowl doors between the inter-compressor frame engagement portion and the second inter-compressor frame engagement portion.

The gas turbine engine according to any preceding clause, wherein the plurality of cowl doors each includes a plurality of bleed air vents extending therethrough for providing a flow of compressor bleed air into the fan bypass airflow passage, and respective ones of the plurality of thrust reverser drag link connectors are arranged circumferentially between respective ones of the plurality of bleed air vents.

The gas turbine engine according to any preceding clause, wherein the inter-compressor frame structure extends outward from an outer side of a compressor casing that encases the low-pressure compressor and the high-pressure compressor.

The gas turbine engine according to any preceding clause, wherein, in a closed position, for each cowl door, the inter-compressor frame engagement portion engages with the cowl door engagement member, and the second inter-compressor frame engagement portion engages with the second cowl door engagement member.

Although the foregoing description is directed to some exemplary embodiments of the present disclosure, other variations and modifications will be apparent to those skilled in the art, and may be made without departing from the present disclosure. Moreover, features described in connection with one embodiment of the present disclosure may be used in conjunction with other embodiments, even if not explicitly stated above.

We claim:
1. A gas turbine engine comprising:
a fan assembly;
a turbo-engine arranged to drive the fan assembly, the turbo-engine at least partially encased within a turbo-engine cowl structure;

a nacelle surrounding the fan assembly and at least a portion of the turbo-engine, a fan bypass airflow passage being arranged between the nacelle and the turbo-engine cowl structure; and a thrust reverser system arranged, at least in part, in the nacelle and including a plurality of actuators, a plurality of thrust reverser blocking doors, and a plurality of drag links connected with respective ones of the plurality of thrust reverser blocking doors and with the turbo-engine cowl structure via a plurality of thrust reverser drag link connectors, wherein the turbo-engine includes (a) a low-pressure compressor, (b) a high-pressure compressor arranged downstream of the low-pressure compressor, (c) an inter-compressor frame structure arranged between the low-pressure compressor and the high-pressure compressor, the inter-compressor frame structure including an outer frame portion having a cowl door engagement member arranged on an upstream side of the outer frame portion, and (d) a plurality of cowl doors defining at least a portion of the turbo-engine cowl structure, each cowl door among the plurality of cowl doors includes (i) an inter-compressor frame engagement portion arranged to engage with the cowl door engagement member of the inter-compressor frame structure, and (ii) the plurality of thrust reverser drag link connectors arranged on an outer side of the cowl door and arranged between the upstream side of the inter-compressor frame structure and a downstream side of the inter-compressor frame structure.

2. The gas turbine engine according to claim 1, wherein the plurality of drag links are connected with the turbo-engine cowl structure via respective ones of the plurality of thrust reverser drag link connectors.

3. The gas turbine engine according to claim 1, wherein the thrust reverser system is a cold stream cascade thrust reverser system.

4. The gas turbine engine according to claim 1, wherein the cowl door engagement member is at least one of a V-groove or a fire seal.

5. The gas turbine engine according to claim 4, wherein the inter-compressor frame engagement portion is a flange that engages with the V-groove or with the fire seal.

6. The gas turbine engine according to claim 1, wherein the plurality of cowl doors comprises two cowl doors, each cowl door being hinged via a cowl door hinge so as to translate the cowl doors between a closed position and an open position.

7. The gas turbine engine according to claim 6, wherein, in the closed position, for each cowl door of the plurality of cowl doors, the inter-compressor frame engagement portion of each cowl door engages in a circumferential direction with the cowl door engagement member of the inter-compressor frame structure.

8. The gas turbine engine according to claim 1, wherein the inter-compressor frame structure further includes an upstream wall and a downstream wall, and a plurality of bleed air openings are provided through the outer frame portion, a bleed air plenum being defined between the upstream wall and the downstream wall.

9. The gas turbine engine according to claim 8, further comprising a variable compressor bleed air valve providing a flow of compressor bleed air from the low-pressure compressor into the bleed air plenum.

10. The gas turbine engine according to claim 9, wherein the plurality of cowl doors each includes a plurality of bleed air vents extending therethrough for providing a flow of the compressor bleed air flowing from the bleed air plenum and through the plurality of bleed air openings of the outer frame portion to flow therethrough into the fan bypass airflow passage.

11. The gas turbine engine according to claim 9, wherein the variable compressor bleed air valve is an operability bleed valve that controls a flow of compressed air flowing from the low-pressure compressor to the high-pressure compressor by controlling the flow of the compressor bleed air flowing into the bleed air plenum.

12. The gas turbine engine according to claim 1, wherein the inter-compressor frame structure further includes a second cowl door engagement member arranged on the downstream side of the outer frame portion.

13. The gas turbine engine according to claim 12, wherein each cowl door further includes a second inter-compressor frame engagement portion arranged to engage with the second cowl door engagement member.

14. The gas turbine engine according to claim 13, wherein the second cowl door engagement member is at least one of a V-groove or a fire seal.

15. The gas turbine engine according to claim 14, wherein the second inter-compressor frame engagement portion is a flange that engages with the V-groove or with the fire seal of the second cowl door engagement member.

16. The gas turbine engine according to claim 13, wherein the gas turbine engine defines a longitudinal centerline axis extending from an upstream end of the gas turbine engine to a downstream end of the gas turbine engine, the inter-compressor frame structure extends circumferentially about the longitudinal centerline axis, and the plurality of cowl doors extend circumferentially about the longitudinal centerline axis.

17. The gas turbine engine according to claim 16, wherein respective ones of the plurality of thrust reverser drag link connectors are arranged circumferentially spaced apart from each other about the outer side of the plurality of cowl doors, and are arranged longitudinally on the outer side of the plurality of cowl doors between the inter-compressor frame engagement portion and the second inter-compressor frame engagement portion.

18. The gas turbine engine according to claim 17, wherein the plurality of cowl doors each includes a plurality of bleed air vents extending therethrough for providing a flow of compressor bleed air into the fan bypass airflow passage, and respective ones of the plurality of thrust reverser drag link connectors are arranged circumferentially between respective ones of the plurality of bleed air vents.

19. The gas turbine engine according to claim 16, wherein the inter-compressor frame structure extends outward from an outer side of a compressor casing that encases the low-pressure compressor and the high-pressure compressor.

20. The gas turbine engine according to claim 19, wherein, in a closed position, for each cowl door, the inter-compressor frame engagement portion engages with the cowl door engagement member, and the second inter-compressor frame engagement portion engages with the second cowl door engagement member.

* * * * *